United States Patent [19]

Mueller-Tamm et al.

[11] 3,973,060

[45] Aug. 3, 1976

[54] PROCESS OF APPLYING NON-ADHESIVE COATINGS TO PLASTICS

[75] Inventors: Heinz Mueller-Tamm; Oskar Buechner; Volker Gierth, all of Ludwigshafen; Karl-Heinz Fauth, Frankenthal, all of Germany

[73] Assignee: Badische Anilin- & Soda-Fabrik Aktiengesellchaft, Ludwigshafen (Rhine), Germany

[22] Filed: July 1, 1974

[21] Appl. No.: 484,435

[30] Foreign Application Priority Data
June 3, 1971  Germany .......................2127416

Related U.S. Application Data

[63] Continuation of Ser. No. 257,942, May 30, 1972, abandoned.

[52] U.S. Cl............................. 427/222; 427/385; 427/387; 428/404; 428/406; 428/407
[51] Int. Cl.$^2$........................................... B05D 7/00
[58] Field of Search ............. 117/100 C, 138.8 UA, 117/138.8 E, 161 UC, 161 L; 427/222, 385, 387; 428/407, 404, 406; 260/64, 78.5 R

[56] References Cited
UNITED STATES PATENTS

| | | | |
|---|---|---|---|
| 2,486,971 | 11/1949 | Ohlmann..................... | 117/161 L X |
| 2,639,808 | 5/1953 | Barry......................... | 117/138.8 E X |
| 3,377,191 | 4/1968 | Macnair..................... | 117/161 UC X |
| 3,661,810 | 5/1972 | Gahmig....................... | 117/100 C X |

FOREIGN PATENTS OR APPLICATIONS

| | | | |
|---|---|---|---|
| 670,986 | 1/1966 | Belgium | |
| 1,811,372 | 6/1970 | Germany.................. | 117/138.8 UA |

OTHER PUBLICATIONS
Alien Property Custodian Serial No. 397,138 5/11/43, Fikentscher et al.

*Primary Examiner*—Harry J. Gwinnell
*Assistant Examiner*—Dennis C. Konopacki
*Attorney, Agent, or Firm*—Johnston, Keil, Thompson & Shurtleff

[57] ABSTRACT

A process for coating moldings of plastics which tend to stick together at room temperature by applying solutions containing a nonadhesive resin of (1) a copolymer of at least one member of the group consisting of styrene and methylstyrene and a monoester of at least one member of the group consisting of maleic and fumaric acid or (2) a reaction product of at least one member of the group consisting of cyclohexanone and methylcyclohexanone with formaldehyde or acetaldehyde, said non-adhesive resin having a monoscope yield point or more than 80°C. and a ball indentation hardness of from 310 to 800 kp/cm$^2$ at 10 seconds and thereafter evaporating the solvent at a temperature which is lower than the softening point of the material to be coated.

7 Claims, No Drawings

PROCESS OF APPLYING NON-ADHESIVE COATINGS TO PLASTICS

This is a continuation of application Ser. No. 257,942, filed May 30, 1972, and now abandoned.

The invention relates to a process for coating moldings which tend to stick together at room temperature with a solution of a nonadhesive resin followed by evaporation of the solvent.

German Published Application No. 2,038,980 discloses a process for improving the surface properties of organic polymeric materials such as polyethylene, polypropylene, polybutene, polyisobutylene and copolymers of butylene and styrene. A solution containing a polar polymer is applied to the surface of the organic polymeric material and the solvent is evaporated. During application and during evaporation the temperature of the surface of the organic polymerized material is lower than the softening point of the organic polymeric material. Examples of polar polymers which can be applied to the organic polymeric material by means of a solvent are copolymers of ethylene and vinyl acetate, methyl acrylate, ethyl acrylate, maleic anhydride, acrylic acid, methacrylic acid or carbon monoxide.

German Published Application No. 1,812,095 discloses a process for coating moldings of bitumen and ethylene copolymers in which an aqueous dispersion of a vinyl chloride or vinylidene chloride polymer is applied to the surface of the molding, said dispersion containing a finely divided hardened urea-formaldehyde resin or a finely divided hardened melamine-formaldehyde resin. Agglomeration of moldings of the said molding materials is thus avoided.

Prior art coatings usually have the disadvantage that they do not remain effective for sufficiently long periods so that for example coated granules of polymers which tend to stick together agglomerate after prolonged storage.

It is also known that granules may be powdered with coal dust, carbon black or talc to prevent the granules agglomerating. As a rule however a marked excess of finely divided parting agent has to be used to ensure that there is complete envelopment of the material to be finished. Powdering tacky granules is either effective for only a short period or gives finished products having different mechanical properties from those of moldings whose surface has not been powdered.

Although finishing moldings with aqueous emulsions of various polymers and condensates avoids these problems, considerable difficulty is encountered in drying. The coating is as a rule not completely effective until it has dried out completely. There is however the risk of agglomeration of the finished granules because in many cases it is necessary to increase the temperature during the drying process to the softening point of the material being finished. Remainders of water may result in significant deterioration in quality by bubble formation during extrusion of the material.

It is an object of the invention to provide a process for coating moldings which does not have the said disadvantages of prior art methods.

The invention consists in a process for coating moldings which tend to stick together at room temperature by the application of a solution containing a nonadhesive resin followed by evaporation of the solvent at a temperature which is lower than the softening point of the material to be coated. The characteristic feature of the process is the use, as the nonadhesive resin, of a copolymer of styrene and/or methylstyrene with a monoester of maleic and/or fumaric acid or a reaction product of cyclohexanone and/or methylcyclohexanone with formaldehyde or acetaldehyde, the nonadhesive resin having a monoscope yield point of more than 80°C and a ball indentation hardness according to DIN 53,456 at 10 seconds of from 310 to 800 kp/cm$^2$. Particularly favorable results are obtained when the solution of the nonadhesive resin contains an inorganic substance having a particle size of less than 100 microns dispersed therein.

Moldings include products which have been prepared by extrusion, calendering or pressing from plastics or mixtures of plastics which tend to stick together at ambient temperature. The moldings may be boards, sheets, tubes, film, sheeting or granules. Preferred among suitable plastics are copolymers of ethylene which contain more than 20% by weight of polymerized units of a polar ethylenically unsaturated compound, polyisobutylene having a molecular weight of from $3 \times 10^5$ to $6 \times 10^6$ (viscosity average) and mixtures of bitumen and ethylene copolymers. Such mixtures contain as a rule from 30 to 95% by weight of bitumen which has a penetration according to DIN 1995 of from 10 to 200 and 5 to 70% by weight of a copolymer of 30 to 97% by weight of ethylene and 70 to 3% by weight of a vinyl ester and/or a copolymerizable acrylic and/or methacrylic compound.

Among suitable polar ethylenically unsaturated compounds copolymerizable with ethylene which are coated according to the process of the invention are vinyl esters of carboxylic acids of one to six carbon atoms, acrylic and methacrylic esters derived from alcohols of 1 to 8 carbon atoms, fumaric esters, maleic esters and the carboxylic acids corresponding to the said esters. The ethylene copolymer may contain two or more of the said comonomers.

The process is characterized by the nonadhesive resin to be used according to the invention. The resins are copolymers of styrene and/or methylstyrene with monoesters of maleic and/or fumaric acid derived from alcohols of 1 to 8 carbon atoms. Methylstyrene includes o-methylstyrene, m-methylstyrene, p-methylstyrene and mixtures of these isomers. For example copolymers of styrene and monomethyl maleate, methylstyrene and monomethyl maleate, styrene and monoethyl maleate, styrene and hexyl maleate, styrene and 2-ethylhexyl maleate, styrene and monomethyl fumarate, styrene and monobutyl fumarate, styrene and 2-ethylhexyl fumarate are suitable. The said copolymers preferably contain from 45 to 55 parts of styrene and/or methylstyrene and from 60 to 70 parts by weight of a monoester of maleic and/or fumaric acid.

Condensation products of cyclohexanone and/or methylcyclohexanone and formaldehyde and/or acetaldehyde are also suitable for the process according to the invention. The production of the condensation products may be carried out according to the methods described in German Patent Specification No. 337,993 with the exception that a mixture of ketone and aldehyde is used instead of pure ketone. Condensation products suitable for the process contain from 38 to 47 parts by weight of the aldehyde and from 80 to 90 parts by weight of cyclohexanone and/or methylcyclohexanone.

The said copolymers and condensation products have a monoscope yield point of more than 80°C and a ball indentation hardness according to DIN 53,456 at 10 seconds of from 350 to 800 kp/cm$^2$ and at 60 seconds of from 315 to 770 kp/cm$^2$. The color number according to DIN 53,403 is only relevant when colorless granules are to be finished. In this case the color number should be less than 20.

The resin is dissolved in a suitable solvent. The criteria include not only adequate solubility for the resin but also a suitable boiling point of the solvent. Examples of suitable solvents are methanol, ethanol, isopropanol, hydrocarbons having boiling points of from 50° to 110°C such as hexane, benzene, heptane, isooctane and mixtures of the said solvents. The boiling point of the solvent should be at from 50° to 110°C, preferably from 60° to 90°C. The viscosity of the solutions is from 2 to 100 centistokes at 20°C.

The process according to this invention is mainly of importance for coating granules. The following methods have proved to be particularly suitable industrially:

1. The granules are spread in a thin layer (the particles should not lie one above the other) on a vibrating screen, are sprayed with a resin solution and then dried by a vigorous stream of air. A non-perforated support may also be used. The screen substantially prevents the formation of a coating on the support and facilitates the subsequent drying operation.

2. The granules are supplied to a bucket chain conveyor. The buckets are of perforated material. The granules are brought into contact in the buckets with the resin solution and thereafter spread out and dried. The individual granules should not be in contact during the drying process because otherwise agglomerates of granules may be formed by bonding.

For reasons of economy the finishing and drying methods described under (1) and (2) should be carried out in a completely closed system because then the solvent used can be recovered.

3. The granules and resin solution are brought into contact in a conveying system. This may be carried out for example by passing a pipe from a solution reservoir into the conveying tube and constricting it there into the shape of a nozzle. Conveying air flowing past at this point produces a negative pressure in the solution pipe and sucks in liquid. The shape of the nozzle ensures the formation of a fine spray. The solution may be injected instead of being sucked in. The conveying system contains means for rapid drying of the granules. Agglomeration is thus precluded. In some cases friction between the granules roughens the surface so that an improvement in the finish is achieved. As shown by microscopic examination of the coatings, the most effective coatings have a rough surface. The said resins dry on the surface of moldings to form a nontacky coating.

In a preferred embodiment of the process according to the invention the dispersion contains an inorganic substance such as silicon dioxide, calcium carbonate, layer silicates such as talc and mica, and other silicates such as glass microspherules and kaolin, and also carbon black, coal dust and graphite dust.

The particle size of the mineral substances should be less than 100 microns, preferably less than 40 microns. The effect of the resin is optimally enhanced by the addition of finely divided powder of the said types in an amount of from 0.1 to 2% by weight based on the material to be coated.

The invention is illustrated in greater detail by the following Examples.

EXAMPLE 1

To provide granules with nonadhesive sheaths use is made of a screen having the dimensions 20 cm × 30 cm which is subjected to intense vibration during treatment of the granules so that agglomeration of the particles is precluded. The mesh width of the screen is 1 mm. The resin solution is fed to the screen through an atomizer. At the same time as, or alternately with, the resin solution a stream of air is directed on to the screen at the rate of 10 liters per minute to dry the granules. The temperature of the stream of air is 30°C.

Substantially spherical particles having a diameter of 3 to 4 mm of a mixture of 52% by weight of bitumen having a penetration (according to DIN 1995 in 1/10 mm) of 148 and 48% by weight of an ethylene copolymer with 21% by weight of n-butyl acrylate are sprayed with 4 milliliters per minute of a 20% solution of resin in ethanol and then dried for 2 minutes. The resin used is a copolymer of 50 parts of styrene and 63 parts of mono-n-butyl maleate which has a yield point under the monoscope of 97° to 100°C, a color number according to DIN 53,403 of 1 to 2, a ball indentation hardness according to DIN 53,456 of 365 kp/cm$^2$ after 10 seconds and 320 kp/cm$^2$ after 60 seconds. The viscosity of the ethanol solution at 20°C is 20.9 centistokes. By comparing the weight of the sample before and after finishing it is found that the resin coating is 0.9% by weight. The effectiveness of the coating is tested as follows: 100 g each of the coated and uncoated material is heat-sealed into polyethylene sheeting bags 120 mm × 100 mm and spread out flat; both bags are then covered with a plate which is loaded with a weight of 19.7 kg for four weeks. At the end of the test period the uncoated granules are firmly bonded together whereas the coated granules are still free-flowing.

EXAMPLE 2

Polyisobutylene particles which have been cut from sheeting having a thickness of about 5 mm and which are in the form of rectangular particles having edge lengths of 5 to 10 mm are sprayed with the same resin solution as described in Example 1 in the apparatus according to Example 1. The polyisobutylene has an average viscosity of the molecular weight of 1,300,000 and a viscosity of $3.6 \times 10^{10}$ poises at 20°C. Each minute 50 g of granules is coated with 3 ml of the resin solution described in Example 1. The increase in weight after coating and drying the particles is 0.6% by weight.

Untreated and coated samples are tested as described in Example 1. After four weeks the untreated particles are bonded together whereas the particles treated with resin are still free-flowing.

EXAMPLE 3

By means of the apparatus described in Example 1 granules consisting of a mixture of equal parts of the polyisobutylene described in Example 2 and a polyethylene having a melt index of 1.8 g/10 minutes are coated. The melt index of the mixture is 0.3 g/10 minutes according to ASTM-D 1238-65 T. The granules are lenticular and have a diameter of about 3 to 4 mm and an average thickness of 2 mm.

The granules are coated with the 20% ethanol solution specified in Example 1 which also contains 10% by weight of a finely divided silicon dioxide (mean particle size 7 microns). 4 ml of the said solution is sprayed on per minute. The increase in weight of the granules is 0.5% by weight. The granules contain 0.3% by weight of silicon dioxide. When the coated granules are tested as described in Example 1, no change in the granules can be established after storage for four weeks whereas a sample which has not been coated is markedly agglomerated.

EXAMPLE 4

Lenticular granules (maximum diameter 3.2 mm, thickness about 2 mm) of an ethylene containing 39% by weight of vinyl acetate units and having a melt index of 35 g/10 minutes according to ASTM D 1238-65 T are coated with a condensation product from 67 parts of cyclohexanone and 33 parts of formaldehyde. The condensation product has a yield point under the monoscope of 95° to 100°C, a characteristic color number according to DIN 53,403 of 1 to 2, a ball indentation hardness according to DIN 53,456 of 580 kp/cm$^2$ after 10 seconds and of 570 kp/cm$^2$ after 60 seconds. The viscosity of a 20% solution in ethanol is 3.61 centistokes. Into a tube having an internal diameter of 7 mm and bent at right angles 130 g per minute of the above-mentioned granules are fed. A current of air of 30 liters per minute is blown in through a connecting pipe at the pipe angle and this causes the conveyance of the granules fed in. After a length of 1 meter the tube passes into a container having a capacity of 3 liters which allows the granules to leave at the bottom and the air current to leave at the top. The granules separated from the air in this container can be discharged when desired or continuously. Together with the air supply tube, a tube having an internal width of 1 mm is introduced into the pipe angle. The lower end of this tube dips into a reservoir of resin solution. The liquid is sucked into the mixture of granules and air by the current of air. The amount of solution sucked in by the air can be regulated by a hose coupling fitted into the liquid tube. It is 7 ml per minute.

Under the conditions specified granules are obtained which are coated with 0.7% by weight of the condensation product of formaldehyde and cyclohexanone. When the coated granules are stored as described in Example 1, the granules are still free-flowing after four weeks whereas the starting material is markedly agglomerated under these conditions.

We claim:

1. A process for coating plastics which tend to agglomerate at ambient temperature selected from the group consisting of copolymers of ethylene which contain more than 20% by weight of polymerized units of a polar ethylenically unsaturated compound, polyisobutylene having a viscosity average molecular weight of from $3 \times 10^5$ to $6 \times 10^6$ and mixtures of bitumen and ethylene copolymers by applying to them a solution consisting essentially of a nonadhesive resin and a solvent having a temperature of from about 50° to 110°C and evaporating the solvent at a temperature which is lower than the softening point of the plastics to be coated, wherein said nonadhesive resin consists of
   1. a copolymer of at least one member of the group consisting of styrene and methylstyrene and a monoester of at least one member of the group consisting of maleic and fumaric acid or
   2. a reaction product of at least one member of the group consisting of cyclohexanone and methylcyclohexanone with formaldehyde or acetaldehyde, said nonadhesive resin having a monoscope yield point of more than 80°C and a ball indentation hardness of from 310 to 800 kp/cm$^2$ at 10 seconds.

2. A process as claimed in claim 1 wherein the boiling point of the solvent is from 60° to 90°C.

3. A process as claimed in claim 1 wherein the solution of the nonadhesive resin has a viscosity of 2 to 100 centistokes.

4. A process as claimed in claim 1 wherein the plastics to be coated are granules.

5. A process as claimed in claim 1 wherein the solution of the resin contains an inorganic substance having a particle size of less than 100 microns dispersed therein, said inorganic substance being selected from the group consisting of silicon dioxide, calcium carbonate, talc, mica, glass microspherules, kaolin, carbon black, coal dust and graphite dust.

6. A process as claimed in claim 5 wherein the inorganic substance is used in an amount of from 0.1 to 2% by weight of the material to be coated.

7. A process as claimed in claim 1 wherein the nonadhesive resin contains from 45 to 55 parts by weight of at least one member of the group consisting of styrene and methylstyrene and from 60 to 70 parts by weight of a monoester of at least one member of the group consisting of maleic and fumaric acid.

* * * * *